United States Patent
Kanameda

(10) Patent No.: US 6,738,776 B2
(45) Date of Patent: May 18, 2004

(54) SYSTEM FOR SELECTING DESIRED ENTRY INFORMATION FROM DIRECTORY INFORMATION STORED IN DIRECTORY SERVER AND USING ENTRY INFORMATION FOR EXTERNAL APPLICATION AND EXTERNAL SERVICE

(75) Inventor: Keiji Kanameda, Tokyo (JP)

(73) Assignee: NEC Corporation, Tokyo (JP)

(*) Notice: Subject to any disclaimer, the term of this patent is extended or adjusted under 35 U.S.C. 154(b) by 393 days.

(21) Appl. No.: 09/977,541

(22) Filed: Oct. 16, 2001

(65) Prior Publication Data

US 2002/0091682 A1 Jul. 11, 2002

(30) Foreign Application Priority Data

Nov. 10, 2000 (JP) ........................................ 2000-343729

(51) Int. Cl.[7] ............................................. G06F 17/30
(52) U.S. Cl. .......................... 707/10; 709/201; 709/246
(58) Field of Search .................. 707/10, 101; 709/201, 709/203, 205, 217, 219, 246

(56) References Cited

U.S. PATENT DOCUMENTS 5,499,343 A * 3/1996 Pettus ........................ 709/203
6,263,377 B1 * 7/2001 Monday et al. ............. 719/320
6,421,716 B1 * 7/2002 Eldridge et al. ............ 709/219
2002/0010781 A1 * 1/2002 Tuatini ....................... 709/227

FOREIGN PATENT DOCUMENTS

| JP | 08-16356 | 1/1996 |
| JP | 08-137731 | 5/1996 |
| JP | 08-137888 | 5/1996 |
| JP | 11-184774 | 7/1999 |
| JP | 2000-163303 | 6/2000 |

OTHER PUBLICATIONS

Severance, C. "Could LDAP Be the Next Killer DAP", Computer, Aug. 1997, IEEE, vol. 30, Issue 8, pp. 88–89.*
McKell, M., "An introduction to Novell's DirXML," Application Notes J, vol. 85, pp. 4–18, Jul. 2000.

* cited by examiner

Primary Examiner—Jack Choules
(74) Attorney, Agent, or Firm—Foley & Lardner

(57) ABSTRACT

A directory information exploitation system has a plurality of external objects associated respectively with a plurality of external applications/external services. An external object selected on a client computer by the user of the directory information exploitation system converts entry information which is selected on the client computer by the user from directory information stored in a directory server into a data format that can be processed by the external applications/external services, and transferred to the external applications/external services.

11 Claims, 5 Drawing Sheets

SYSTEM FOR SELECTING DESIRED ENTRY INFORMATION FROM DIRECTORY INFORMATION STORED IN DIRECTORY SERVER AND USING ENTRY INFORMATION FOR EXTERNAL APPLICATION AND EXTERNAL SERVICE

BACKGROUND OF THE INVENTION

1. Field of the Invention

The present invention relates to a directory information exploitation system having a directory server which stores directory information.

2. Description of the Related Art

Conventional directory information exploitation systems are able to retrieve directory information stored in a directory server to select entry information and display the selected entry information and also to acquire a mail address based on the directory information retrieved under specified retrieval conditions according to a mail transmission software function.

However, those conventional directory information exploitation systems are incapable of displaying the retrieved directory information in a tree structure, selecting entry information by following the tree structure, and activating a desired application using the selected entry information to call a service thereof or call a service of a desired application which has already been activated.

In order to utilize a desired application using directory information stored in a directory server, it is necessary for the system user to transfer entry information to an input section of the application either manually or using a cut-and-paste function of the OS (Operating System). Alternatively, it is necessary to convert entry information into a data format such as LDIF (LDAP (Lightweight Directory Access Protocol) Directory Interchange Format) or CSV (Comma Separated Values), save the converted entry information in an external file, and read the external file from the application.

In either case, the user needs to perform complex operations in order to utilize the desired application using the directory information stored in the directory server.

SUMMARY OF THE INVENTION

It is an object of the present invention to provide a directory information exploitation system which allows the user to utilize a desired application using directory information stored in a directory server without performing complex operations.

According to the present invention, a directory information exploitation system has a plurality of external objects associated respectively with a plurality of external applications/external services. An external object selected on a client computer by the user of the directory information exploitation system converts entry information which is selected on the client computer by the user from directory information stored in a directory server into a data format that can be processed by the external applications/external services, and transferred to the external applications/external services.

Therefore, the user can utilize external applications/external services simply by selecting desired entry information and an external object on the client computer. The user is thus not required to perform complex operations in utilizing external applications/external services using directory information.

The user can utilize the plural external applications/external services on one client computer by switching between the external objects.

The external applications/external services can utilize directory information stored in the directory server even if the external applications/external services do not have a function to access the directory server and hence have their functions limited.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
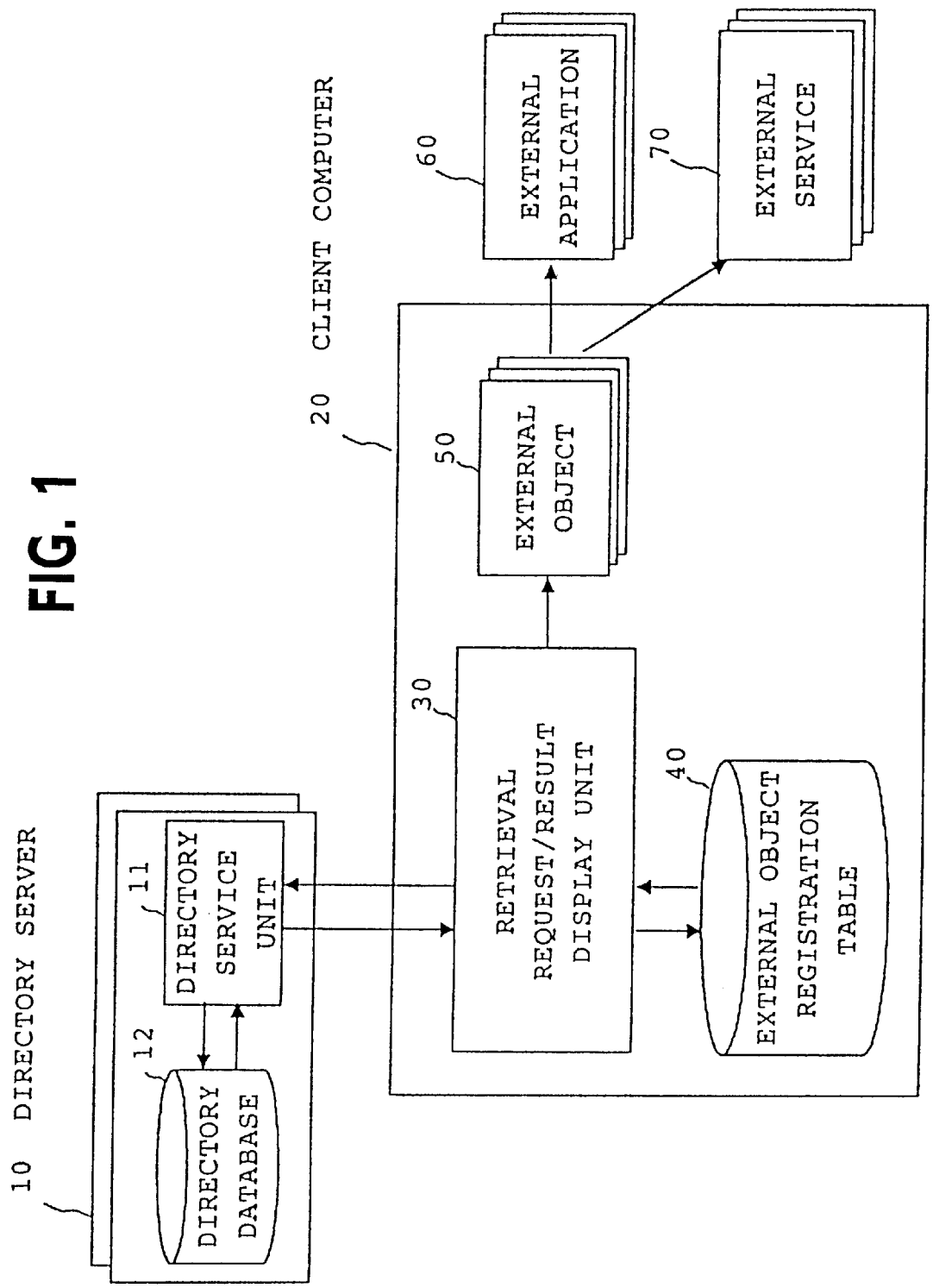
FIG. 1 is a block diagram of a directory information exploitation system according to an embodiment of the present invention.

As shown in FIG. 1, a directory information exploitation system according to an embodiment of the present invention has directory server 10 including directory service unit 11 and directory database 12, and client computer 20 including retrieval request/result display unit 30, external object registration table 40, and a plurality of external objects 50. External objects 50 are associated respectively with external applications 60 and external services 70.

Figure 2:
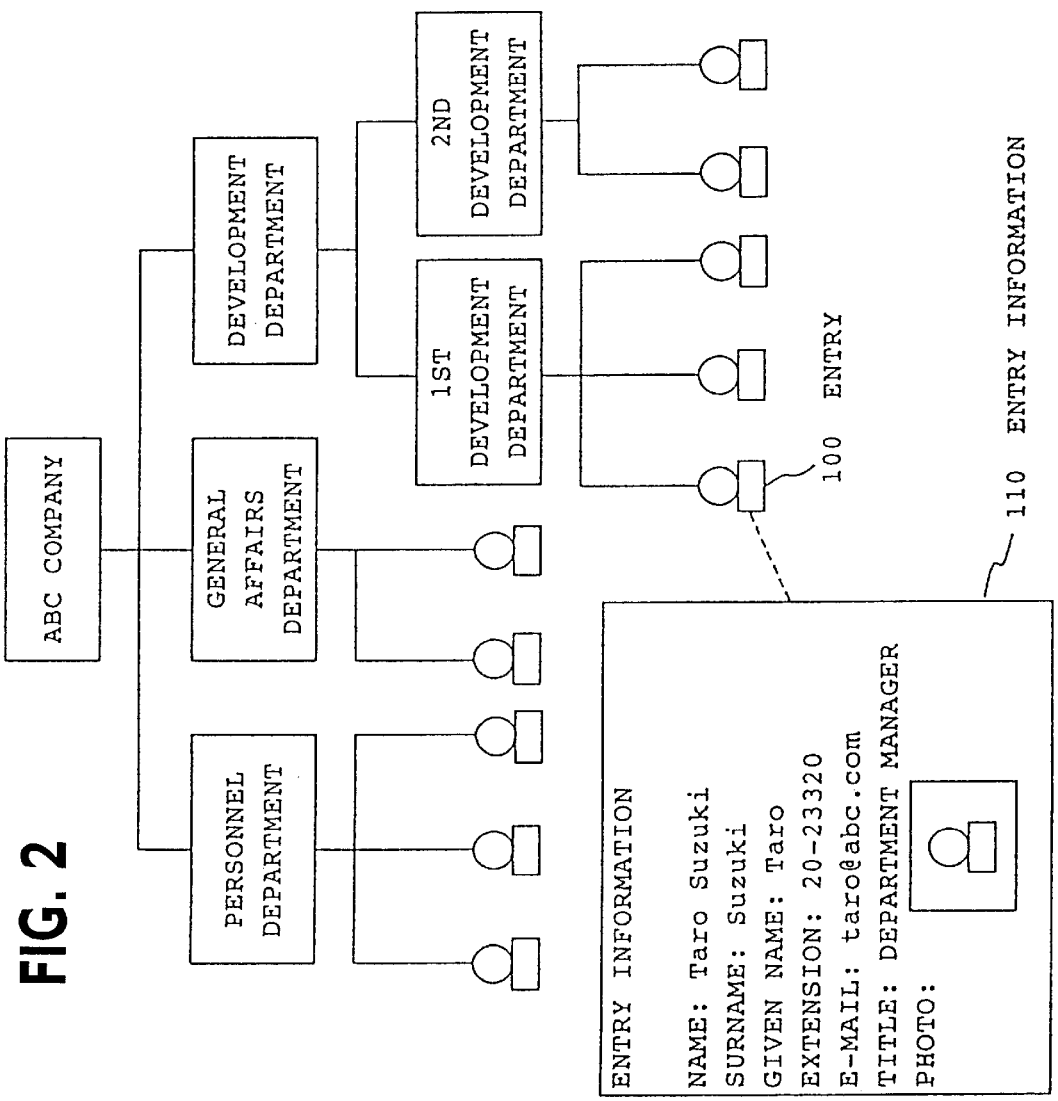
FIG. 2 is a diagram showing an example of directory information stored in a directory database shown in FIG. 1.

Directory database 12 is a database which stores directory information. For example, directory database 12 stores directory information as shown in FIG. 2.

Directory service unit 11 retrieves directory information stored in directory database 12 based on a retrieval request that is issued by retrieval request/result display unit 30 in client computer 20, and transfers the retrieved directory information to retrieval request/result display unit 30.

Retrieval request/result display unit 30 generates a retrieval request based on a command from the user of the directory information exploitation system, and issues the retrieval request to directory service unit 11 in directory server 10. Retrieval request/result display unit 30 also displays directory information that has been retrieved which has been transferred from directory service unit 11 in response to the retrieval request.

Figure 3:
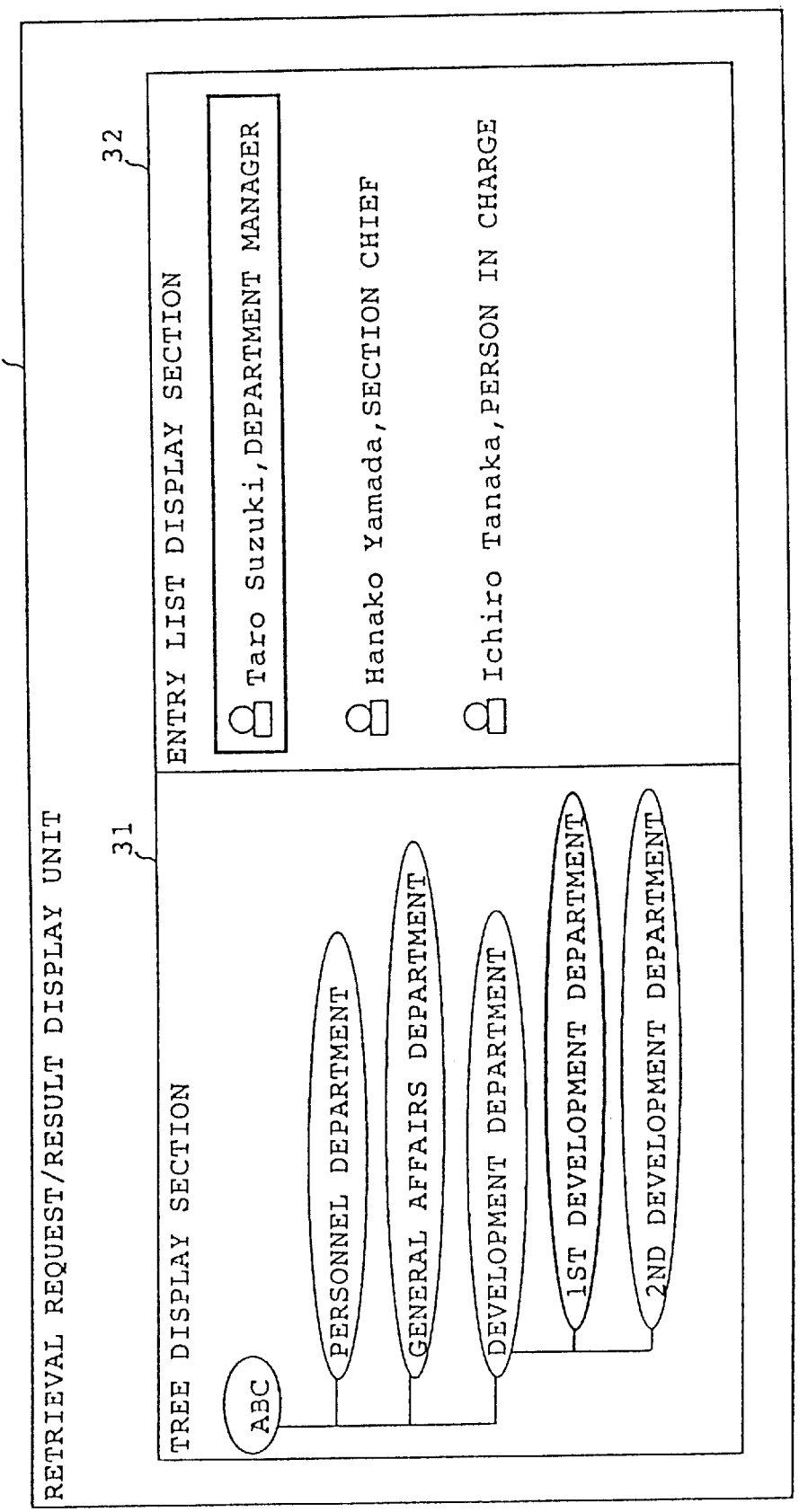
FIG. 3 is a view showing a displayed image of a tree display section and an entry list display section in a retrieval request/result display unit shown in FIG. 1.

As shown in FIG. 3, retrieval request/result display unit 30 has tree display section 31 and entry list display section 32. Each of tree display section 31 and entry list display section 32 has a GUI (Graphical User Interface) function. Retrieval request/result display unit 30 also has a retrieval condition specifying function separate from the GUI function.

Tree display section 31 displays a tree structure of retrieval nodes of directory information stored in directory database 12 in directory server 10 to prompt the system user to select a desired one of the displayed nodes, and issues a retrieval request to directory service unit 11 based on the selected node. Tree display section 31 acquires retrieved directory information in directory database 12 from directory service unit 11, and additionally displays a tree structure of information of nodes that are placed under the node selected by the user.

Entry list display section 32 is capable of displaying a list of entries directly under the node which has been selected in tree display section 31 by the system user. Entry list display section 32 is also capable of displaying a list of entries of the retrieved directory information which has been obtained by the retrieval condition specifying function of retrieval request/result display unit 30.

Retrieval request/result display unit 30 transfers collected data of entries (e.g., names, telephone numbers, etc.) to either one of external objects 50. These collected data of entries can be selected by either one of tree display section 31 and entry list display section 32. In tree display section 31, the system user can select an entry from three types of entries, i.e., all entries under the selected node, an entry directly under the selected node, and an entry of only the selected node, and can also select a plurality of nodes. In entry list display section 32, the system user can select a plurality of entries.

External object registration table 40 is a table for allowing the system user to select either one of external objects 50. Retrieval request/result display unit 30 allows the system user to select either one of external objects 50 using external object registration table 40 and transfers collected data of entries to external object 50 which has been selected by the user.

As shown in Table 1 below, external object registration table 40 is a table of function names, object names, and data names. The function names refer to the names of functions that can be selected by the system user. The object names refer to the names of external objects 50 or object IDS for calling services of external applications 60 or external services 70. The data names refer to the names of entry data that are required by external objects 50.

TABLE 1

| Function name | Object name | Transfer data names |
|---|---|---|
| Make extension call | TelCall | sn, given name, extension telephone number |
| Send mail | SendMail | sn, given name, mail |
| View face photo | PhotoView | photo, binary |

Each of external objects 50 is a program component for converting collected data of entries transferred from retrieval request/result display unit 30 into a data format that can be processed by external applications 60 or external services 70, and transferring the converted data to external applications 60 or external services 70. The data format into which collected data of entries are converted by external objects 50 includes CSV, LDIF, XML (extensible Markup Language), command line arguments.

Each of external applications 60 is a desired application program, and receives data from external objects 50 in various manners, e.g., by specifying a file in a command line or acquiring data from a clipboard. Processes of detecting the transfer of data from external objects 50 with external applications 60 include a process of detecting the transfer of data with a file given from external objects 50 when external applications 60 are activated, and a process of detecting the transfer of data with a file given from external objects 50 via a clipboard. One of these processes is determined depending on a process of receiving data in external applications 60.

Of the plurality of external objects 50, those external objects 50 which correspond to external applications 60 are generated depending on the process of receiving data in external applications 60. Depending on the process of receiving data in external applications 60, external objects 50 activate external applications 60.

Each of external services 70 is a desired service program that is in an executed state at all times. For example, external services 70 can be used when external objects 50 call services of external services 70 using an API (Application Program Interface).

Of the plurality of external objects 50, those external objects 50 which correspond to external services 70 are generated using an API for calling services of external services 70.

External objects 50 may be disposed outside of client computer 20 as distributed objects. External applications 60 may be application programs on client computer 20 or application programs on another computer. External services 70 may be service programs on client computer 20 or service programs on another computer. Directory server 10 may be a server on client computer 20 or a server on another computer. A plurality of directory servers 10 may be employed.

Operation of the directory information exploitation system shown in FIG. 1 will be described below with reference to a flowchart shown in FIG. 4. An operation sequence of the directory information exploitation system for activating a desired one of external applications 60 to call its service will be described below. In order to distinguish a mode of activating external application 60 and calling its service and a mode of calling the service of external application 60 which has already been activated from each other, the former mode is referred to as "calling external application 60", and the latter mode as "calling the service of external application 60". Similarly, a mode of calling service of external service 70 which has already been activated is referred to as "calling the service of external service 70". Since external services 70 are in an executed state at all times, "calling external service 70" does not take place.

Figure 4:
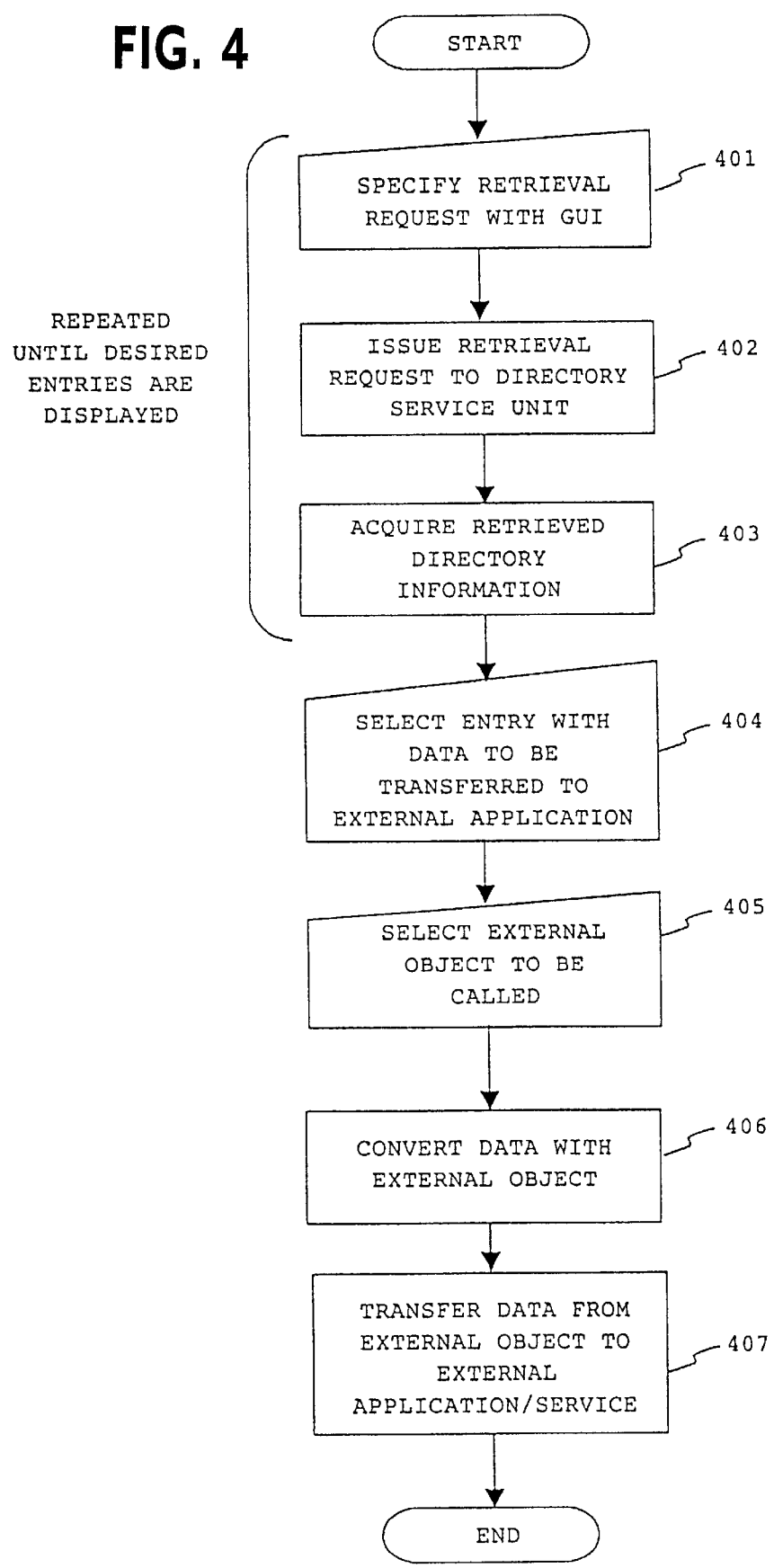
FIG. 4 is a flowchart of an operation sequence of the directory information exploitation system shown in FIG. 1.

In step 401 shown in FIG. 4, the system user specifies details of a retrieval request to be issued to directory server 10 using retrieval request/result display unit 30 on client computer 20. At this time, the system user specifies a retrieval request using the GUI function or the retrieval condition specifying function of retrieval request/result display unit 30.

In step 402, retrieval request/result display unit 30 generates a retrieval request based on the details specified by the system user, and issues the generated retrieval request to directory service unit 11 in directory server 10.

In step 403, directory service unit 11 retrieves directory information stored in directory database 12 based on the retrieval request issued by retrieval request/result display unit 30, and transfers the retrieved directory information to retrieval request/result display unit 30. Retrieval request/result display unit 30 displays the retrieved directory information transferred from directory service unit 11 on tree display section 31 and entry list display section 32.

The system user repeats the processing in step 401 to step 403 until desired entries are displayed on tree display section 31 and entry list display section 32.

In step 404, when desired entries are displayed on tree display section 31 and entry list display section 32, the system user selects an entry having collected data to be transferred to desired external application 60 from the displayed entries using the GUI function. The system user can specify not only the collected data of the selected entry, but also the collected data of an entry under or directly under the selected entry for transfer to desired external application 60.

In step 405, the system user selects external object 50 required to use the service of desired external application 60 from external objects 50 based on a function name using external object registration table 40. Retrieval request/result display unit 30 transfers the collected data of the entry selected by the system user to the external object selected by the system user.

Then, in step 406, external object 50 which has received the collected data of the entry converts the collected data of the entry received in step 405 into a data format that can be processed by desired external application 60. In step 407, external object 50 transfers the data to that external application 60 to call external application 60. External application 60 may receive data according to various processes using a file format, a clipboard format, an API call, etc., and data formats in external application 60 include CSV, LDIF, etc. Therefore, external object 50 selects an optimum data transfer process and an optimum data conversion format, and then calls external application 60.

In the above example, calling external application 60 has been described. However, when the service of external application 60 is to be called or the service of external service 70 is to be called, an optimum data transfer process and an optimum data conversion format are selected in steps 406, 407.

A specific example of an operation sequence of the directory information exploitation system shown in FIG. 1 will be described below with reference to FIGS. 2 and 3 and Table 1. It is assumed that the directory information of a tree structure as shown in FIG. 2 is stored in directory database 12, and the system user makes an extension call to "Taro Suzuki".

The system user retrieves an entry of "Taro Suzuki" using retrieval request/result display unit 30 on client computer 20. If the system user is to retrieve an entry using the GUI function on tree display section 31, then the system user selects a node displayed in a tree structure and retrieves an entry while developing nodes under the selected node. If the system user is to retrieve an entry using the retrieval condition specifying function of retrieval request/result display unit 30, then the system user specifies a retrieval condition "Surname=Suzuki, Given name=Taro" and retrieves an entry under the specified retrieval condition. In either case, the retrieved entry is displayed on entry list display section 32.

Then, the system user selects the entry "Taro Suzuki" on entry list display section 32 shown in FIG. 3, and selects either one of external objects 50 using external object registration table 40. Since the system user wants to make an extension call to "Taro Suzuki", the system user selects the first function "Make extension call" in Table 1. As shown in Table 1, external object 50 required to use the function "Make extension call" is an external object "TelCall" whose object name is "TelCall", and data to be transferred to the external object "TelCall" are "sn(SurName), given name" and "extension telephone number".

Based on Table 1, retrieval request/result display unit 30 takes data "Taro Suzuki" of "sn(SurName), given name" and data "20-23320" of "extension telephone number" from entry information 110 of entry 100 shown in FIG. 2, thereafter calls the external object "TelCall", and transfer the data to external object "TelCall".

It is assumed that external application 60 for making an extension call is an external application "tel.exe" capable of making a call by specifying an extension number in a first argument of command line arguments, and the form of an extension call in the external application "tel.exe" needs "8-" to be added before the extension number. The external object "Telcall" adds "8-" to the data of the extension telephone number "20-23320", received from retrieval request/result display unit 30, thus generating data "tel.exe 8-20-23320", and transfers the data "tel.exe 8-20-23320" to call the external application "tel.exe". The external application "tel.exe" now makes an extension call to "Taro Suzuki".

Another operation sequence of the directory information exploitation system shown in FIG. 1 will be described below with reference to FIG. 5.

Figure 5:
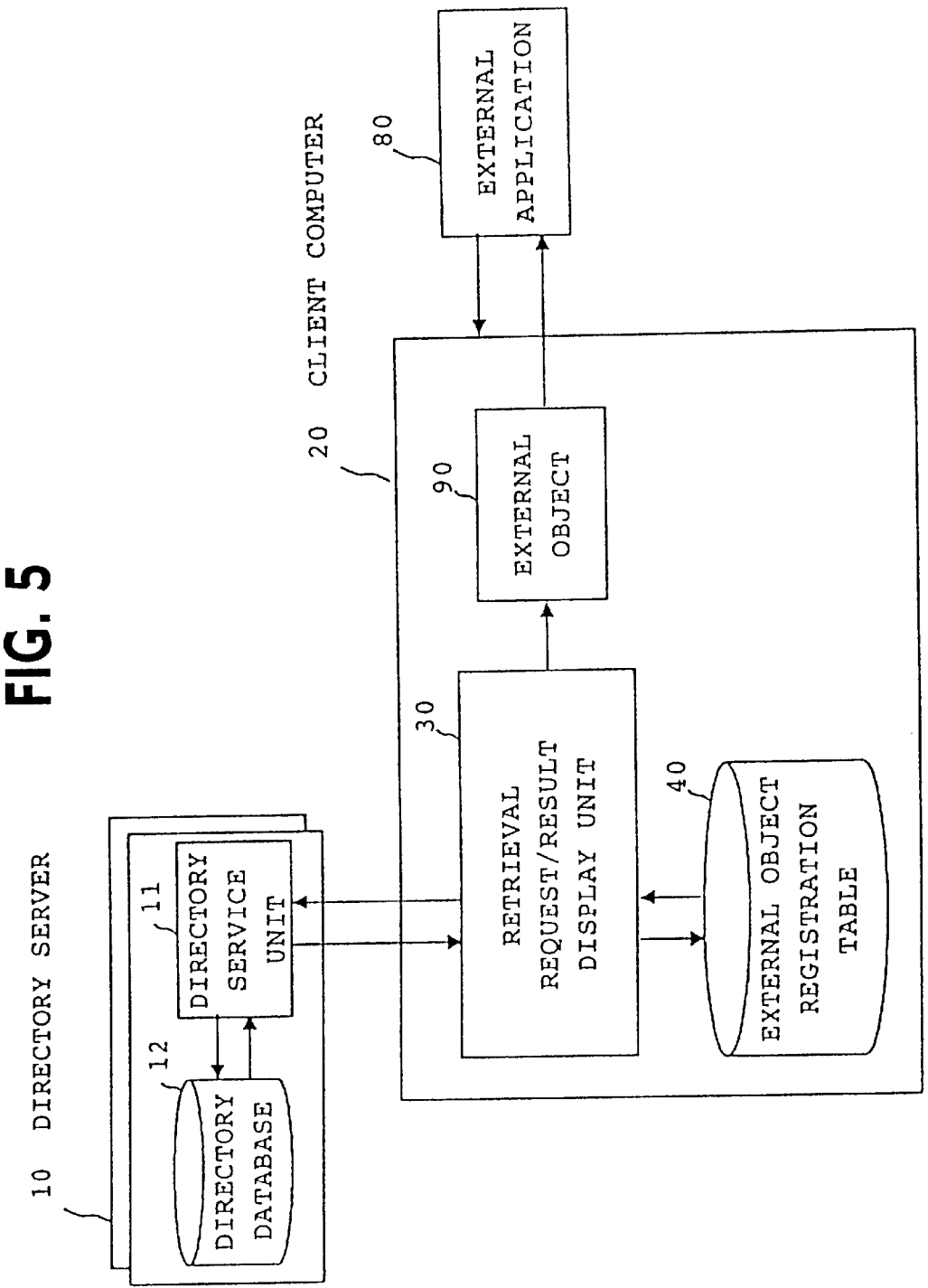
FIG. 5 is a block diagram illustrative of another operation sequence of the directory information exploitation system shown in FIG. 1.

In FIG. 5, certain components of the directory information exploitation system shown in FIG. 1 are omitted from illustration. Specifically, of external applications 60, only external application 80 having a menu and buttons for activating the directory information exploitation system is illustrated, and of external objects 50, only external object 90 for transferring data to external application 80 is illustrated, with external services 70 being omitted from illustration.

It is assumed that external application 80 has been activated before the directory information exploitation system is activated, and the directory information exploitation system is activated when the menu and buttons of external application 80 are operated on. Since directory server 10 is a general service program and activated at all times, only client computer 20 is activated from external application 80.

When the directory information exploitation system is activated, a data format and a process of receiving data in external application 80 have been determined. Since a data conversion format and a method of transferring data in either one of external objects 50 have already been determined, external object 90 is necessarily determined from within external objects 50. If external application 80 is capable of handling a plurality of data formats and performing a plurality of processes of receiving data, it is possible for external application 80 to select a data format and a process of receiving data at the time the directory information exploitation system is activated.

External object 90 converts entry data transferred from retrieval request/result display unit 30, and transfers the converted entry data to external application 80. The process of transferring data has already been determined. The process of transferring data is other than a process of activating external application 80. For example, the process of transferring data may be a process of transferring data using a data file saved on a clipboard or in a particular place, or a process of transferring data using an API or a message for the external application.

After the directory information exploitation system is activated, data is transferred from external object 90 to external application 80. The transfer of data from external object 90 is detected with a message from external object 90 or a shutdown of the directory information exploitation system by an action of the system user.

External application 80 can thus utilize the directory information exploitation system for retrieving and acquiring directory information stored in directory server 10.

While preferred embodiments of the present invention have been described using specific terms, such description is for illustrative purposes only, and it is to be understood that changes and variations may be made without departing from the spirit or scope of the following claims.

What is claimed is:

1. A directory information exploitation system for allowing a user to utilize a plurality of external applications and external services using directory information stored in a directory server, comprising:

a client computer having retrieval request/result display means for transmitting a retrieval request for directory information specified by the user to said directory server and displaying the retrieved directory information transferred from said directory server in response to said retrieval request for the user to select desired entry information; and a plurality of external objects associated respectively with said external applications and said external services, for converting the entry information selected by the user with said retrieval request/result display means into a data format which can be processed by said external applications or said external services and transmitting converted data to said external applications or said external services.

2. A directory information exploitation system according to claim 1, wherein said client computer has an external object registration table for said retrieval request/result display means to cause the user to select either one of said external objects.

3. A directory information exploitation system according to claim 2, wherein said retrieval request/result display means has a Graphical User Interface function and a retrieval condition specifying function for allowing the user to select said entry information.

4. A directory information exploitation system according to claim 3, wherein said retrieval request/result display means comprises means for allowing the user to select said entry information using said Graphical User Interface function by displaying a tree structure of nodes for retrieving said directory information to prompt the user to select a node to generate said retrieval request, transmitting the retrieval request to said directory server, and displaying a tree structure of retrieved directory information transferred from said directory server in response to said retrieval request for the user to select the entry information.

5. A directory information exploitation system according to claim 4, wherein of said external objects, the external objects corresponding to said external applications are generated depending on a process of receiving said entry information in said external applications, and wherein of said external objects, the external objects corresponding to said external services are generated using an Application Program Interface for calling services of said external services.

6. A directory information exploitation system according to claim 5, wherein said external objects are provided inside said client computer.

7. A directory information exploitation system according to claim 6, wherein said directory server comprises a server on a computer which is different from said client computer.

8. A directory information exploitation system according to claim 6, wherein said directory server comprises a server on said client computer.

9. A directory information exploitation system according to claim 5, wherein said external objects are provided outside said client computer.

10. A directory information exploitation system according to claim 9, wherein said directory server comprises a server on a computer which is different from said client computer.

11. A directory information exploitation system according to claim 9, wherein said directory server comprises a server on said client computer.

* * * * *